United States Patent Office 3,726,903
Patented Apr. 10, 1973

3,726,903
FLUORO COMPOUNDS
Robert J. Koshar, Lincoln Township, Washington County, Charles D. Wright, White Bear Lake, Joseph La Mar Zollinger, Woodbury Township, Washington County, and Douglas H. Dybvig and Donald R. Husted, St. Paul, Minn., assignors to Minnesota Mining and Manufacturing Company, St. Paul, Minn.
No Drawing. Filed Mar. 6, 1964, Ser. No. 351,581
Int. Cl. C07c 123/00; C07d 5/00
U.S. Cl. 260—347.7  14 Claims This invention relates to compounds which contain a new functional group, the trifluoroformamidino moiety; and to processes for their preparation.

It is an object of the present invention to provide a novel and useful class of reactive fluoroamino compounds. It is another object of the invention to prepare a new and valuable class of intermediates for chemical synthesis. It is a further object of the invention to provide compounds which readily release the oxidizing power present in the fluoroamino groups. Other objects will be apparent from the disclosures hereinafter made.

The compounds of the invention are organic compounds which contain the new functional group, $$\begin{array}{c} NF_2 \\ | \\ -C=NF \end{array}$$

covalently bonded to the remainder of the molecule.
The compound, $$\begin{array}{c} NF_2 \\ | \\ H-C=NF \end{array}$$

is correctly named N,N,N'-trifluoroformamidine; but for convenience and brevity hereinafter this compound is designated trifluoroformamidine; and it is to be understood that when the trifluoroformamidino group $$\begin{array}{c} NF_2 \\ | \\ -C=NF \end{array}$$

is referred to, the nitrogen atoms are fluorinated as shown. When the hydrogen atom is replaced, the compounds are substituted trifluoroformamidines, the appropriate radical name for the substituent being added. Alternatively, the simpler, fully fluorinated compounds containing this grouping may for convenience be referred to as perfluoro compounds, e.g. perfluoroguanidine, $$NF_2C(NF_2)=NF$$

The residue to which the trifluoroformamidino group is attached, i.e. substituent radical which forms the remainder of the compound, is required only to be free from functional groups which will react with the trifluoroformamidino groups; such groups are strongly basic, i.e. nucleophilic, in nature, such as hydrocarbon, alkyl primary and secondary amino groups, and certain reactive reducing groups. These include

substituents which have a pK$_a$ of greater than 1.0, reactive metal bonds, e.g. groups which contain reactive metal to carbon, metal to oxygen and metal to hydrogen bonds and pi-bonded metallo-organic moieties; ionically bonded iodide; sulfide; and polyhydroxy aromatic nuclei. All other organic and inorganic functional groups commonly known to the art can be present in the compounds of this invention which contain the trifluoroformamidino functional group. Some illustrative compounds are as follows:

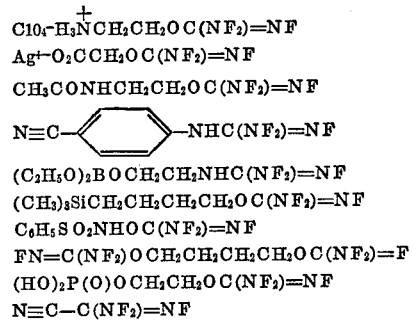

A definition of pK$_a$ and extensive tabulations of pK$_a$ values for nitrogen bases are found in Ionization Constants of Acids and Bases by Adrien Albert and E. P. Serjeant, John Wiley and Sons, Inc., New York, N.Y., 1962, p. 137, table 8.10.

An interesting and useful subgroup of the invention is represented by the formula $$\begin{array}{c} NF_2 \\ | \\ R_f-C=NF \end{array}$$

wherein R$_f$ is a polyfluoroalkyl radical having from 1 to 18 carbon atoms. In addition to straight and branched alicyclic radicals, such R$_f$ radicals include, subject to the requirements set forth above, polyfluorinated carbocyclic and heterocyclic rings, for example, polyfluoropyridyl, polyfluorocyclohexyl, polyfluorocyclohexyl ethyl and the like. The presence of other atoms in the carbon chain, e.g. oxa, aza, peroxy and the like groups is also included within the scope of the term.

Compounds of the formula $$\begin{array}{c} NF_2 \\ | \\ R-X-C=NF \end{array}$$

wherein R is a radical having from 1 to 30 carbon atoms, of the group consisting of alkyl, aryl, polyhaloalkyl, polyhaloaryl, alkaryl, aralkyl, polyhaloalkaryl, polyhaloaralkyl, and heterocyclic radicals which are free from functional groups which react with the trifluoroformamidino group, and X is a divalent linking radical of the group consisting of —O—O—, —S—, —O—, —NH—, —NR—, —CH=N— and —CH=NO— form a useful class of compounds readily formed by splitting HNF$_2$ or HF from certain adducts of perfluoroformamidine or perfluoroguanidine and a number of classes of compounds such as alcohols, amines, oximes, imines, thiols, hydroperoxides and the like.

Other carbon-containing, organic radicals to which can be attached the trifluoroformamidino moiety directly or through an oxygen or nitrogen atom, and likewise subject to the requirements set forth above, include hydrocarbons, both aromatic and aliphatic, such as naphthyl, benzyl, phenanthryl and the like; aliphatic hydrocarbon radicals such as ethyl, propyl, hexyl, etc. up to 18 carbons; cyclo-aliphatic radicals such as cyclopentyl, cyclohexyl, etc.; radicals derived from heterocyclics such as pyridine, thiophene, diazines, diazoles, furan, furazole and the like. When attached directly they can be visualized as conforming to the formula set forth immediately above, where the linking group is a carbon atom substituted by hydrogen or other groups or atoms.

Similar compounds of the invention prepared from adducts as disclosed hereinafter have the formula

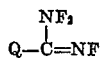

wherein Q is —NH$_2$, —N$_3$ (azido), —NCO, —F, —Cl, —Br, —CN, —NCS and the like.

Several general methods for the preparation of the compounds of the invention have been discovered. Broadly speaking, these methods include the following:

(1) The direct fluorination of organic compounds which contain the group,

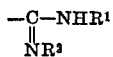

or its tautomeric form

wherein R$^1$ and R$^2$ consist of an element such as hydrogen or groups, such as nitro, acyl, and the like, which can be cleaved and replaced by fluorine. This method is especially suited for the preparation of trifluoroformamidino compounds which contain large amounts of fluorine. An example of the method is the fluorination of ammeline.

(Eq. 1)

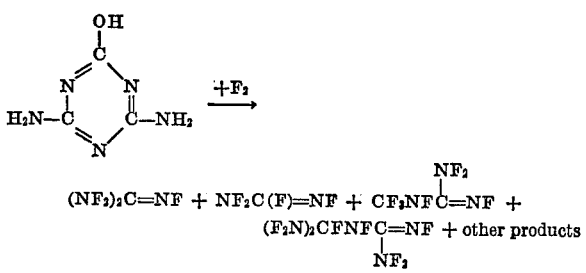

Additional examples of organic nitrogen compounds which can be fluorinated to give various trifluoroformamidino compounds are guanylurea, biguanide and cyanoguanidine as well as various derivatives of these compounds and the like, such as their hydrofluoride salts. We have found that these highly useful NF-containing compounds result from the fluorination of the described organic compounds if the exotherm is adequately controlled by techniques such as cooling, dilution, rapid stirring, and the like. Under these conditions, it is possible to control and direct the cleavage and NH substitution reactions during fluorination so that the desired products, especially highly fluorinated compounds, can be obtained in good yields. Generally speaking, mixtures of saturated and unsaturated compounds, i.e. fluorimino compounds, are obtained. The ratios of saturated to unsaturated products can also be altered by changes in reaction conditions.

The fluorination, using a fluorinating agent such as elemental fluorine, can be conducted by a variety of methods such as static bed, fluidized bed, stirred suspension in a fluorocarbon solvent (which process is especially suitable for large scale preparations), and solution or suspension in polar solvents such as acetonitrile and trifluoroethanol. Stirring and other types of agitation are advantageous in dissipating the large heat of reaction during fluorination.

The fluorination process is conducted at a temperature in the range of about —100 to +40° C., or even somewhat higher. The elemental fluorine may be introduced in a dilute or pure form. Hydrogen fluoride is generally formed, and in some cases it is advantageous to employ an acceptor for the hydrogen fluoride, and this acceptor is preferably not reactive to elemental fluorine. Thus compounds such as sodium fluoride, potassium fluoride, and the like can be present with the NH compound to accept the hydrogen fluoride formed during the fluorination and to act as diluents. Alternatively, a sodium fluoride scrubber can be placed downstream from the reaction zone to remove hydrogen fluoride from the gaseous products. It should be noted that the temperature of said sodium fluoride scrubbers and the residence time of the scrubbed gases can sometimes affect the product distribution obtained.

The trifluoroformamidino products of the invention can be collected in cold traps during fluorination, or they can be caused to remain as a residue in the reactor or in solution when liquid diluents are used. The desired products are then recovered by distillation, extraction, chromatography, and other common techniques.

(2) The reaction of trifluoroformamidino compounds with active hydrogen-containing compounds to form new trifluoroformamidino products.

(Eq. 2) 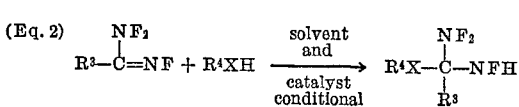

(Eq. 3) 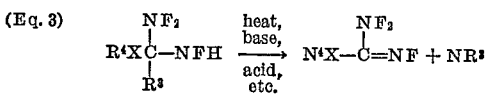

where X is

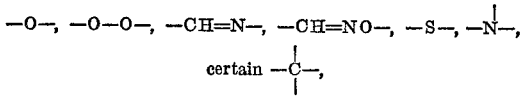

etc., and where R$^4$ can be varied widely. R$^4$ is an organic or inorganic radical of widely varying nature. It can, for example, be alkyl, aryl or heterocyclic (substituted within the limits set forth hereinabove), including polymers, fluorocarbons and the like. The R$^4$XH compound in equation 2 can also be an inorganic substance such as HN$_3$, HNCO, NH$_3$, HF, HCl, HBr, HCN and the like. R$^3$ is an electron withdrawing group and preferably is —NF$_2$, —F or —Cl. The reaction is very general and involves two steps.

First, the addition of a nucleophilic, Zerewitinoff active hydrogen-containing compound, R$^4$XH, to an electron deficient double bond in R$^3$—C(NF$_2$)=NF occurs. When R$^4$XH is weakly nucleophilic, basic catalysts such as urea, N,N'-dimethylurea, triethylamine, sodium cyanide and the like can be used to promote the addition reaction. Since the addition is ionic in nature, polar solvents such as acetonitrile, trifluoroethanol, nitromethane, ethyl acetate, sulfolane, sulfone ethers and the like are often very advantageous; but their use is not absolutely necessary. Water is generally to be avoided during the addition reaction which is illustrated by Equation 2.

When strongly nucleophilic R$^4$XH compounds are reacted in the first step, the addition is exothermic and cooling and dilution are then advantageous. The addition is carried out at temperatures from about —150 to +100° C. depending upon the speed of the reaction.

In the second step, the —NFH compounds can be treated with heat, base or acid for the purposes of this invention to cause facile elimination of HR$^3$ and complete the trifluoroformamidino interconversion of R$^4$X— for R$^3$— as shown in Equation 3. Useful reagents which cause the elimination of HR$^3$ are sodium fluoride, potassium fluoride, and the like, and triethylamine and the like.

In some instances the elimination of HR³ can be spontaneous at the reaction temperatures employed. A variation of the procedure of method 2 is that in which the anion of R⁴XH, namely R⁴X—, is used directly and in effect a nucleophilic displacement of R³— by R⁴X— occurs. An example is the reaction, (Eq. 4)

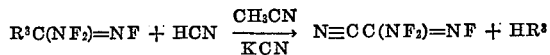

The scope of this method of preparation is very broad. The radical R⁴ can have other substituents of the most varied nature consistent with the limitations set forth hereinabove.

(3) The stepwise introduction of the —NF₂ group into fluorimino group-containing compounds through reaction with ammonia or its equivalent, followed by fluorination.

(Eq. 5)

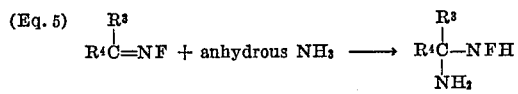

(Eq. 6)

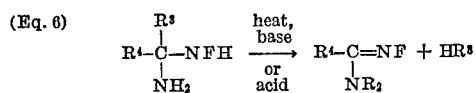

(Eq. 7)

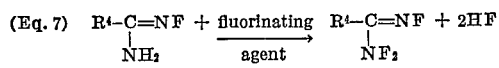

This method of preparation of trifluoroformamidino compounds involves the nucleophilic addition of ammonia or its equivalent to a fluorimino compound to form an —NFH group-containing product, Equation 5, which generally is not isolated but treated directly to form the amino substituted fluorimino compounds which exist mainly in the tautomeric form in Equation 6, although the other tautomeric form is possible and operable in this synthesis. The conditions described in method 2 above apply also to Equations 5 and 6 of this method of preparation. The amino-substituted fluorimino compound is fluorinated, especially with elemental fluorine, as shown in Equation 7, by procedures hereinabove described (Method 1).

The substituent R³ is preferably an electronegative group. Certain other compounds, having the formula R⁵R⁶NH, can be used in place of anhydrous ammonia in Equation 5 above, provided that R⁵ and R⁶ are radicals which are replaced by fluorine during the fluorination step. For instance, H—N=C=O may be used instead of NH₃.

(4) The reaction of trifluoroformamidino compounds with free radicals to form new trifluoroformamidino molecules.

(Eq. 8)

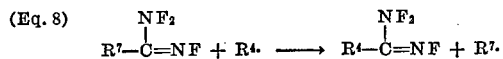

R⁴· is a free radical, the nature of the radical being widely variable. R⁷ is a stable radical which is cleaved off in the reaction. It should be noted that this free radical reaction and the nucleophilic reaction (method 2) are complementary. For example, in cases where the anion, R⁴—, constitutes a weakly basic nucleophile, the radical, R⁴·, may add readily.

The free radical R⁴· can be generated by the usual means such as heating of peroxides, azo compounds and the like and by photolysis of many compounds with light of appropriate wavelength. The reaction can be conducted in gas phase and in liquid phase, whereupon non-reactive solvents such as halocarbons, hydrocarbons, ethers, and the like are sometimes useful. The method is especially useful when photolysis at low temperatures is employed. Higher yields are usually obtained when R₇· is a more stable radical than R⁴. Since ·NF₂ is a stable radical, perfluoroguanidine is a generally useful starting material in Equation 8.

(5) The pyrolysis of saturated NF-containing compounds, such as compounds containing the tris(difluoramino)methyl group, (Eq. 9)

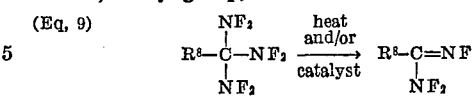

R⁸ is a substituent which is more strongly bonded to the carbon than the NF₂ group, e.g. F.

The preferred method is the passage of the saturated NF-containing compound through a heated tube which contains metal catalysts, such as copper, iron, magnesium and the like (Equation 9).

Several of the methods described hereinabove for the preparation of trifluoroformamidino compounds are conducted at low temperatures, sometimes as low as —120° C. The high reactivity of the trifluoroformamidino group makes such cryogenic syntheses possible. Accordingly, some trifluoroformamidino compounds can be prepared at low temperatures and reacted again at low temperatures to form compounds of value. Included within the scope of this invention are trifluoroformamidino compounds which are stable and useful at low temperatures, such as —120° C., but which may not be stable at about 25° C. Fluorine nuclear magnetic resonance spectra can be obtained at low temperatures, and such a technique is a convenient and powerful method for following reactions and determining structures during cryogenic syntheses at temperatures as low as —190° C.

The compounds prepared by methods 1–5 above can be gases, liquids or solids under ordinary conditions. They may be highly volatile, boiling as low as about —30° C., or in contrast they may be liquids or solids having little or no detectable volatility. All of the compounds react at least to some extent with potassium iodide solutions, such as a solution of potassium iodide in aqueous acetonitrile, to liberate iodine, thus indicating their oxidizing properties.

The fluorimino compounds of this invention are isolated and purified by several techniques. In the case of gases or liquids boiling up to about 200° C., they can be purified by gas liquid chromatography, in which high boiling non-reactive liquids or polymers on an inert solid support (e.g., diatomaceous earth or firebrick) are used as the stationary phase, and by distillation. In the case of solids, the trifluoroformamidino compounds can be purified by recrystallization, solvent extraction, sublimation, solid-liquid absorption column chromatography, and other related techniques. The solid supports for gas liquid chromatography should be acid washed and dried to avoid decomposition of the trifluoroformamidino compounds.

Care must be used in the selection of solvents for the procedures of isolation and purification described above so as to avoid reaction with, or decomposition of, the trifluoroformamidino compounds. In general, anhydrous conditions should be maintained. Organic compounds as nucleophilic as 2-chloroethanol containing active hydrogen should not be used since addition to the fluorimino group occurs. Easily oxidized compounds and tertiary amines should not be used. Thus, suitable solvents include benzene, hexane, chloroform, ethyl acetate, trifluoroethanol and acetic acid; solvents which must be used with extreme care and in some cases avoided include methanol, phenol, dimethyl sulfoxide, pyridine and dimethylformamide.

The trifluoroformamidino functional group of the compounds of this invention can usually be characterized by infrared absorptions in the region of about 5.8 to 6.2 microns ($\mu$) which are associated with the carbon-nitrogen unsaturation and absorptions in the region of about 9.5 to 11.5 microns which are associated with the fluoramino (NF) groups. The intensities of these absorptions can vary widely depending on the characteristic of the residual group such as electronegativity and molecular weight.

Fluorine and proton nuclear magnetic resonance spectroscopic measurements are also useful for the identification of the described compounds. Various types of fluorine-containing groups in the molecule can be distinguished by their shielding values expressed in $\phi$ units, employing $CFCl_3$ as the standard as described by G. Filipovich and G. V. D. Tiers (Journal of Physical Chemistry, vol. 63, pp. 761–762, 1959); the $\phi^*$ values defined there by the authors are here given simply as $\phi$ values. Likewise, various types of hydrogen-containing groups in the molecule can be distinguished by their shielding values expressed simply as $\tau$ when tetramethylsilane is employed as reference as described by G. V. D. Tiers (Journal of Physical Chemistry, vol. 62, p. 1151, 1958).

The trifluoroforamidino functional group,

usually exhibits shielding values in the range of about —60 to 0$\phi$, and especially in the —50 to —35$\phi$ area, for the fluorine atoms in the $NF_2$ group; and in the range of about —50 to +50$\phi$ for the fluorine atoms of the =NF group. The area ratio of the —$NF_2$/=NF absorptions is about 2 and this is also useful in structure determinations.

The compounds of this invention can exist as syn and anti geometric isomers as represented by the following formulas:

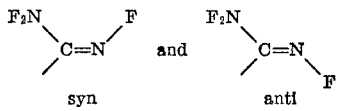

wherein the dangling valence is attached to the residue of the compound.

The ratio of these isomers varies considerably and can often be controllably altered by changing reaction conditions. In some cases only one of the isomers is observed, however. This may be due to the mode of preparation or to facile thermal or catalytic interconversion of the isomers. Both syn and anti isomeric forms of the compounds are included within the scope of this invention even though not specifically identified as such therein. When desired, these isomers can generally be isolated as distinct compounds by methods such as chromatography and crystallization and can usually be distinguished from each other by known methods of analyses such as infrared, ultraviolet and nuclear magnetic resonance spectroscopy as is further disclosed in the experimental section.

It should be noted that many basic, i.e. nucleophilic, substituents can be present in the trifluoroformamidino compound provided that these basic substituents are protected and rendered non-reactive by the preparation of suitable derivaties. Thus, alkylamino groups can be made less reactive by reaction with a compound containing an acylhalide group to form amide groups, which are compatible with trifluoroformamidino groups, especially at low temperatures. Many other active hydrogen-containing groups can be protected in like manner. A trifluoroformamidino group can then be prepared, or attached by reaction with a functional group, in another part of the molecule. By such a sequence of reactions, additional compounds of the invention can be prepared. Such blocking or protection of functional groups for these purposes is well known to the art.

Many of the compounds of the invention, especially those which contain a high N–F content, are explosive and sometimes toxic, and suitable safety equipment and techniques should be employed. Generally speaking, ordinary laboratory hoods equipped with ¼ to ½ inch plastic shields provide a safe working area when about one gram of the most energetic compounds, such as perfluoroguanidine, are manipulated, reacted, tested, stored, etc. Protective clothing for the operator, such as leather jacket, gloves, face shield and ear plugs, is recommended. Large quantities of these chemicals should be handled with remote manipulators.

It has also been observed that certain compounds of the invention have a higher tendency to explode when undergoing certain phase changes when in pure or highly concentrated form. Thus, perfluoroguanidine often explodes when frozen or thawed. Therefore, the use of a non-flammable slush bath, such as a —111° C. bath prepared by mixing liquid nitrogen with trichlorofluoromethane, is recommended when said compound is manipulated in gas transfer systems.

The compounds of the invention are oxidizers useful as bleaching agents, explosive ingredients, rocket fuel ingredients and chemical intermediates. Some of them are especially suitable for reactions at low temperatures (i.e. for cryogenic synthesis). Facile release of the oxidizing power occurs in aqueous media. Those which contain additional NF groups so as to have a high percentage of NF bonds are especially useful for propellants or explosives.

Polymeric compounds containing appropriate groups can be reacted under the conditions as set forth in methods 1–4 above for organic material, to produce polymers having trifluoroformamidino substituents. In these compounds, the trifluoroformamidino group retains its chemical characteristics, so that polymers having oxidizing power can be produced. However, this oxidizing power is well controlled by the extent to which trifluoroformamido groups have been introduced, so that materials having useful bleaching power, for example, can be produced. Furthermore, such polymers, being reactive, can be chain extended or crosslinked, to produce new materials which are of higher molecular weight. It will be appreciated that where the polymer contains several functional groups distributed along the chain, one or more of such functional groups can be reacted, thus producing poly (trifluoroformamidino)-substituted polymers. Illustrative of the polymers which can be employed are polyvinyl alcohol, polyethylene oxides with hydroxyl end groups or substituents, cellulose mononitrate, cellulose dinitrate, cellulosic materials such as starch and cotton, hydrolyzed copolymers of vinyl acetate and polyvinyl amine.

When the compounds of the inveniton are non-polymeric, preferably from about 1 to about 30 carbon atoms are present therein. Polymeric substances, of course, may have molecular weights up to 50,000 or more, containing hundreds or even thousands of carbon atoms in the chain. As noted, the presence of such long carbon chains does not destroy the typical activity of the trifluoroformamidino group.

The difluoroamino portion of the trifluoroformamidino group can be substituted by replacement of one of the fluorine atoms, and the resulting substituted fluoroformamidino group is equivalent to the trifluoroformamidino group for the purposes of inclusion in the compounds of the invention. Thus, one of the fluorines can be replaced by a perfluoroalkyl radical, a fluoroamino-substituted perfluoroalkyl radical or a chlorine atom. Such compounds are preferentially prepared by methods 1 and 2 hereinabove.

These compounds are likewise useful as bleaches, propellant ingredients and chemical intermediates.

In order to further illustrate the wide scope of this invention, the following examples, in which all parts are by weight and percentages are weight/volume unless otherwise specified, are presented. The fluorochemical compositions identified by the trademark names Kel-F 90 grease and Kel-F oil 8126 are low molecular weight poly (chlorotrifluoroethylene); FX–45 is a fluorocarbon liquid; FC–43 is perfluorotributyl amine and FC–75 is a fluorochemical liquid boiling at about 100° C. These can be obtained from the Minnesota Mining and Manufacturing Company.

EXAMPLE 1

Ammeline (1.5 g.) is spread onto a two inch by twelve inch copper tray which is placed in a 1.5 liter horizontal cylindrical copper reactor (Reactor A). The reactor is fitted with a gas inlet for fluorine and/or nitrogen at one end and an effluent gas outlet at the other end. The gas outlet is connected serially to an iron tube filled with sodium fluoride pellets which is usually maintained at room temperature, a borosilicate glass trap which is cooled with liquid air and finally a vent line. The reactor and connections can be composed of metals such as copper or monel or other materials which are inert to fluorine.

The reactor is first flushed with nitrogen for about 15 minutes and is then cooled by means of a bath maintained at $-15°$ C. The nitrogen flow is continued until the temperature inside of the reactor near the copper tray is about $-3°$ C. Gaseous fluorine, diluted with nitrogen, is then introduced into the reactor at a volume concentration of 6% until a total of about 0.15 mole of fluorine is delivered over a period of seven hours. After the completion of the fluorination, the reactor is allowed to warm to room temperature and is flushed with nitrogen during this period. The more volatile fluorination products are collected in the trap cooled with liquid air, while solid and liquid products having low volatility remain in the reactor.

The products in the trap are transferred by means of a vacuum manifold and are condensed into a tube which is graduated in 0.1 cc. units. The tube and contents are allowed to warm gradually to $-78°$ C. and then maintained at this temperature.

The more volatile components which expand into the vacuum manifold are composed of products such as carbonyl fluoride, nitrogen trifluoride and tetrafluoromethane and are bled off intermittently until a final vapor pressure of about 40 mm. Hg (in a volume of 0.12 liter) remains above the liquid residue in the tube. The liquid residue which amounts to about 1.1 grams is then allowed to warm gradually to $25°$ C. and the volatile components (Fraction I) are expanded into the manifold and are condensed into a storage vessel until a vapor pressure of about 60 mm. Hg (volume of 0.12 liter) remains above the high boiling liquid residue in the tube. The high boiling liquid residue (Fraction II) amounts to about 0.05 cc. at $25°$ C. Fracton I amounts to about 0.7 cc. of liquid measured at $-78°$ C. and contains various fluoramino compounds boiling mainly in the range of $-30$ to $+30°$ C.

About 20 mole percent of Fraction I is composed of various trifluoroformamidino compounds including: perfluoroguanidine, $(F_2N)_2C=NF$; perfluoroformamidine, $F_2NCF=NF$; and perfluoro(N-methylguandine), $$CF_3NFC(NF_2)=NF$$

in the molar ratio of about 13:4:1, respectively. The components of this fraction can be separated by gas chromatography employing a 24 foot, ½ inch column composed of 33% by weight of FX-45 on Chromasorb P (a diatomaceous silica product commercially available from Johns-Manville and Company) which is carried out at room temperature with helium as the carrier gas. The retention values, designated as $T_R$, for perfluoroformamidine, perfluoroguanidine and perfluoro(N-methylguanidine) under the above conditions are about 30, 94 and 205, respectively. The retention values, $T_R$, are relative to trichlorofluoromethane as a standard of 100 and are obtained by the equation, $$T_r = \frac{\text{retention time of component} - \text{retention time of air}}{\text{retention time of } CFCl_3 - \text{retention time of air}} \times 100$$

Other fluoramines such as tris(difluoroamino)fluoromethane and bis(difluoroamino)difluoromethane are also found in Fraction I.

Table I gives some additional properties and analyses of perfluoroformamidine, perfluoroguandine and perfluoro(N-methylguanidine); fluorine nuclear magnetic resonance (F N.M.R. shielding values are given in $\phi$ units when trichlorofluoromethane is used as a reference. The compounds are also identified by their infrared and mass spectra.

TABLE I

| Trifluoroformamidino compound | B.P., °C. | F N.M.R., $\phi$ values | Molecular weight Found | Molecular weight Calcd. | Found C | Found F | Found N | Calcd. C | Calcd. F | Calcd. N |
|---|---|---|---|---|---|---|---|---|---|---|
| $F_2NCF=NF$ | $-30\pm3$ | $\begin{cases}-42.6\ (NF_2)\\+20.4\ (NF)\\+83.6\ (CF)\end{cases}$ | 117 | 116 | 10.5 | 64.5 | 24.0 | 10.3 | 65.5 | 24.2 |
| $(F_2N)_2C=NF$ | $-2.3\pm1$ | $\begin{cases}-46.8\ (NF_2)\\-42.3\ (NF_2)\\-20.2\ (NF)\end{cases}$ | 148 | 149 | 8.3 | 62.2 | 28.2 | 8.05 | 63.7 | 28.2 |
| $CF_3NFC(NF_2)=NF$ | $+30\pm5$ | Isomers [1] | 192 | 199 | 12.1 | 64.9 | 20.4 | 12.1 | 66.8 | 21.1 |

[1] See the following:
A = $-46.4$ ($NF_2$); $-25.1$ (=NF); $+69.5$ ($CF_3$); $+72.5$ (NF).
B = $-40.8$ ($NF_2$); $-27.2$ (=NF); $+69.9$ ($CF_3$); $+48.5$ (NF).

Fraction II contains the trifluoroformamidino compounds which boil in the range of about 30 to 100° C. or higher. Included in Fraction II is $$(F_2N)_2C\,FN\,FC=NF$$
$$\quad\quad\quad\quad\quad\ |$$
$$\quad\quad\quad\quad\quad NF_2$$

which has a vapor pressure of about 55 mm. Hg at room temperature and can be isolated by chromatography employing columns which are usually heated in the range of about 80 to 100° C. and are composed of low volatile inert fluorochemicals such as the Kel-F 90 grease, and the fluorosilicone fluid, FS-1265 (Dow Corning product), which are supported on Chromasorb P. One of the isomers of $$(F_2N)_2C\,FN\,FC=NF$$
$$\quad\quad\quad\quad\quad\ |$$
$$\quad\quad\quad\quad\quad NF_2$$

exhibits fluorine nuclear magnetic resonance shielding values ($\phi$) at about $-41.8$ ($NF_2$), $-35.6$ (=NF), $-24.5$ ($NF_2$), $+52.1$ (NF) and $+126.5$ (CF).

Additional examples of the preparation of trifluoroformamidino compounds by the fluorination process are carried out in Table II.

TABLE II

| Example | Composition Fluorinated | Reactor type | F₂, percent by vol. in stream | Time, hrs. | Temp. °C. | F₂, Total mole | Weight, g. | Wt. ratio of I:II | Product (Fractions I and II) Trifluoroformamidino compounds |
|---|---|---|---|---|---|---|---|---|---|
| 2 | Ammeline (1.5 g.), NaF (1.5 g.) | B | 5.7 | 8.0 | −3 to 0 | 0.24 | 1.7 | 1:1 | $F_2NCF=NF$, $(F_2N)_2C=NF$, $CF_3NFC(NF_2)=NF$, $(F_2N)_3$, $CF_2NFC(NF_2)=NF$ |
| 3 | Ammeline (1.5 g.) in 75 cc. of $(C_4F_9)_3N$ | C | 5.7–67; 100 | 0.5; 1.3 | 13 to 16 | 0.51 | 0.3 | 3:1 | $F_2NCF=NF$, $(F_2N)_2C=NF$ |
| 4 | Ammeline (1.5 g.), graphite (6.0 g.) | C | 1.8; 6.0 | 1.0; 2.0 | −35 to −22 | 0.19 | 0.3 | 4:1 | $F_2NCF=NF$, $(F_2N)_2C=NF$ |
| 5 | Ammeline hydrofluoride salt (1.1 g.) | D | 9.0; 7.5 | 0.9; 1.1 | 9 to 15 | 0.05 | 0.8 | 10:1 | $F_2NCF=NF$, $(F_2N)_2C=NF$, $CF_3NFC(NF_2)=NF$ |
| 6 | Guanylurea (1.0 g.) | B | 5.7 | 7.0 | −3 | 0.21 | 0.2 | (a) | $(F_2N)_2C=NF$ |
| 7 | Guanylurea (1.0 g.), NaF (1.0 g.) | B | 5.7 | 7.0 | 0 | 0.21 | 0.2 | (a) | $(F_2N)_2C=NF$ |
| 8 | Poly(carbonylguanidylene) (1.2 g.) | D | 6.9–8.7 | 5.5 | −73 | 0.14 | 0.3 | 5:1 | $F_2NCF=NF$, $(F_2N)_2C=NF$ |
| 9 | Cyanoguanidine (1.5 g.) | B | 1.0; 1.0; 5.5 | 1.0; 1.0; 0.4 | −4 to 2 | 0.24 | 0.2 | 4:1 | $F_2NCF=NF$, $(F_2N)_2C=NF$ |
| 10 | Biguanide (0.8 g.) | B | 5.7; 9.3; 21.8 | 1.9; | −13 to 60 | 0.06 | 0.2 | (a) | $F_2NCF=NF$, $(F_2N)_2C=NF$ |
| 11 | Biguanide (0.65 g.), NaF (0.55 g.) | D | 9.4; 18.8; 8.8 | 2.5 | −11 to 29 | 0.07 | 0.3 | (a) | $F_2NCF=NF$, $(F_2N)_2C=NF$ | a Mainly fraction I.

Conditions similar to those described above are used. The three types of reactors used include Reactor B which is a 0.65 liter rectangular brass reactor fitted with a 2 inch by 10 inch monel sintered plate at the bottom, Reactor C which is a 0.1 liter vertical reactor having a one inch diameter and is fitted with a one inch monel sintered plate at the bottom and Reactor D which is a 0.1 liter copper U-tube reactor having an inside diameter of ½ inch. When fluorinations are carried out in Reactors B and C, the composition to be fluorinated is placed on the sintered plate and the fluorine is introduced at the bottom of the reactor and through the sintered plate. The outlets of these reactors are located at the top. Fractions I and II are obtained as described in above example.

Ammeline hydrofluoride is prepared by the reaction of anhydrous hydrogen fluoride and ammeline. The hydrofluoride salt contains about 1.5 molar equivalents of hydrogen fluoride and has the analyses: 10.5 milliequivalents of $H^+$/gram and 10.0 milliequivalents of $F^-$/gram. Poly(carbonylguanidylene), also expressed as

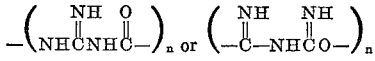

is prepared by the reaction of guanidine carbonate and urethane as described by Werner (A. E. A. Werner, Sci. Proc. Roy. Dublin Soc., vol. 24, p. 199, 1947).

The temperatures shown in Table II are recorded by means of thermocouples within the reactor with the exception of Example 8 which is the temperature on the outside of the reactor. The higher temperatures generally represent exotherms recorded during the fluorinations. In some cases, during the course of the fluorination, the concentration of fluorine in the gas stream was increased stepwise.

The trifluoroformamidino compounds given in Table II are illustrative of compounds which are obtained under the described conditions and do not exclude the formation of other trifluoroformamidino compounds.

The trifluoroformamidino compounds are conveniently stored in dry tight glass containers. Perfluoroguanidine may be stored in 1 to 2 gram quantities as a gas in dry 250 cc. glass storage bulbs fitted with a greased glass stopcock.

EXAMPLE 12

The following example illustrates a large-scale preparation of trifluoroformamidino compounds by the fluorination of ammeline. The operations are carried out remotely behind a 14 inch concrete barricade.

A mixture of 14 pounds of ammeline, 3 pounds of water, 5 pounds of sodium fluoride and 100 pounds of the fluorochemical FC-75 is charged into a ten gallon stainless steel pressure reactor having an inside diameter of 14 inches. The reactor is equipped with a stirrer having a 4 inch blade which rotates at about 800 to 960 r.p.m., a fluorine gas inlet extending into the mixture and located under the stirrer blade, a pressure gauge, a jacket and cooling coil on the inside and a gas exit line which is located at the top and is equipped with a pressure relief valve. The reactor is enclosed in a steel chamber.

The reactor is cooled to about −10° C. and is flushed with nitrogen to expel air. Gaseous fluorine, diluted with nitrogen, is then introduced into the reactor at a concentration of 80 to 90% throughout the run while maintaining the pressure at 25 to 30 p.s.i.g. and a temperature range of −10 to 20° C. Any excessive pressure build-up is controlled by means of a back pressure regulator. The addition of fluorine is continued over a period of about 4.0 hours until 14 pounds of fluorine are delivered. Temperature and fluorine feed are controlled so that fluorination and degradation of the fluorochemical, FC-75, to form toxic perfluoroisobutylene does not occur.

The reactor is then cooled to −40° C. and the mixture is discharged from the bottom, filtered and the filtrate is then collected in a distillation vessel. During this process the mixture is maintained at about −40° C. and very low boiling products such as carbonyl fluoride, nitrogen trifluoride and tetrafluoromethane are vented.

Distillation of the filtrate using a 20 plate stainless steel Oldershaw column gives several fractions including (1) 0.4 pound of a fraction boiling at −30 to −32° C. which contains a mixture of about equal parts of perfluoroformamidine and bis(difluoroamino)difluoromethane, $F_2NCF_2NF_2$, and (2) 1.5 pounds of a fraction boiling at −3 to 0° C. which contains mainly perfluoroguanidine.

The trifluoroformamidino compounds can be stored as solutions in the fluorochemical, FC-75.

EXAMPLE 13

A 2 cc. borosilicate glass reactor which contains 0.13 cc. of acetonitrile and 2 milligrams of potassium cyanide is cooled to −110° C. and charged by means of a vacuum manifold with 0.9 millimoles of anhydrous hydrogen cyanide and 0.6 millimole of perfluoroguanidine. The reactor is closed and allowed to warm gradually to room temperature over a period of 20 hours. The components of the reaction mixture can be separated by chromatography employing a three meter, ½ column composed of 33% by weight of FC-43 on Chromasorb P at 0° C. About 0.3 millimole of perfluorocyanoformamidine, $F_2NC(CN)=NF$, is isolated and consists mainly of one of its geometric isomers designated as Isomer A which has a retention value ($T_R$) of 69 relative to $CFCl_3$ as 100 on the FC-43 column. Perfluorocyanoformamidine (Isomer A) boils at about 20° C. and exhibits fluorine nuclear magnetic resonance shielding values ($\phi$) at about −56.8 ($NF_2$) and −50.8 (NF). The following molecular weight and elemental analyses were obtained; Found: C, 19.1%; F, 44.8%; N, 30.4%; mol. wt., 125. Calcd. for $C_2N_3F_3$: C, 19.5%; F, 46.3%; N, 34.1%; mol. wt. 123.

Perfluorocyanoformamidine (Isomer A), also shows infrared absorption at 4.44 microns due to —C≡N, at 6.14 microns (relatively weak) due to the fluorimino (—C=N—) unsaturation, and strong absorptions at 10.65 microns and 11.26 microns which are associated with the N-F and $NF_2$ groups.

EXAMPLE 14

A gas mixture of 0.95 millimole of ammonia and 10 millimoles of dimethyl ether is charged intermittently by means of a vacuum manifold into a 5 cc. borosilicate glass reactor which is cooled to −110° C. and contains a stirred solution of perfluorocyanoformamidine (Isomer A) in 0.7 cc. of liquid dimethyl ether. The resulting mixture is stirred at −110° C. for one hour. The dimethyl ether and volatile components are removed at −63° C. under vacuum until the vapor pressure above the residual adduct is less than about 1 mm. Hg. The reactor, containing the adduct, is then filled with nitrogen and is stored at −78° C. prior to its fluorination.

Fluorination of the adduct in the above reactor is carried out at −60 to −55° C. using 3% fluorine diluted with nitrogen which is metered from a 2.3 liter cylinder. After 5.5 hours a total of 38.5 millimoles of fluorine is used. The product (0.34 millimole) is collected in a series of borosilicate glass traps cooled with liquid oxygen.

Chromatographic separation of the product by using a six meter ½ inch column of 33% by weight of Kel-F oil 8126 on Chromasorb P at 25° C. yields perfluorocyanoformamidine having a retention value ($T_R$) of 55 which is relative to $CFCl_3$ at 100.

Perfluorocyanoformamidine (Isomer B) exhibits fluorine nuclear magnetic resonance shielding values ($\phi$) at −51.1 ($NF_2$) and −53.0 (NF). Isomer B exhibits infrared absorptions at 4.40 microns due to —C≡N, at 6.25 microns due to the fluorimino unsaturation (—C=N—) and at 10.20 microns and 11.24 microns which are associated with the NF and $NF_2$ groups.

EXAMPLE 15

According to the procedure of Example 14, anhydrous ammonia (0.17 g., 10 millimoles) is added slowly from a gas transfer system to a stirred mixture of perfluoroformamidine (0.8 g., 6.9 millimoles) in dry pure dimethyl ether (3.0 cc.) at −110° C. After one hour the solvent is removed in vacuo at −63° C. The residual product is fluorinated with about 5% fluorine diluted with nitrogen at −30° C. at a flow rate of about 0.18 standard cubic foot per hour until 1.5 g. of fluorine has been passed through the system. The volatile gases are collected in a glass trap at liquid oxygen temperature and are found to contain perfluoroguanidine and other fluoramino compounds.

EXAMPLE 16

The starting material, methoxybis(difluoramino)fluoraminomethane, $CH_3OC(NF_2)_2NFH$, is prepared by the addition of methanol to perfluoroguanidine. To a dry 10 cc. capacity glass reactor cooled to −100° C. ($CFCl_3$ slush) and fitted with a polytetrafluoroethylene needle valve is transferred under vacuum 0.088 g. (2.75 millimoles) of methanol and 0.45 g. (3.0 millimoles) of perfluoroguanidine. The valve is closed and the reaction mixture let warm to room temperature and stand overnight. The valve is then opened and the excess perfluoroguanidine is pumped off until the vapor pressure of the mixture is that of the addition product (15 mm. at 25° C.). The colorless liquid residue is nearly pure methoxybis(difluoraminomethane,

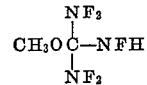

The nuclear magnetic resonance absorptions are at −20.6$\phi$ (F of $NF_2$ groups), 144.6$\phi$ (F of NFH groups, double quintuplet) and 6.02$\tau$ (H of $CH_3O$— group).

The residual liquid adduct, $CH_3OC(NF_2)_2NFH$, in the reactor is cooled to −110° C., degassed and let warm to room temperature while conducting the vapors through an evacuated U-tube containing about 25 g. of powdered anhydrous sodium fluoride (Merck reagent). The resulting product gases are allowed to pass into two evacuated traps connected in series, cooled to −78° C. and −110° C., respectively. The −78° C. trap contains 1.92 millimoles of methoxytrifluoroformamidine, $$CH_3OC(NF_2)=NF$$

Isomer A, and the −110° C. trap contains a like amount of difluoramine, $HNF_2$.

EXAMPLE 17

About 0.09 g. (0.5 millimole) of $CH_3OC(NF_2)_2NFH$ is charged under vacuum to a 20 cc. glass tube which is cooled to −78° C. and contains 0.16 g. of silver difluoride ($AgF_2$). The tube is closed and allowed to warm gradually to 0° C. and kept at this temperature for 1½ hours. The volatile reaction products are $HNF_2$, $N_2F_4$ and the syn and anti isomers of $CH_3OC(NF_2)=NF$. These compounds are separated by gas chromatography using a 5 meter, ½ inch column composed of 20% by weight of FS-1265 (a Dow-Corning fluorosilicone fluid) on Chromasorb P at 60° C. The $T_R$ values and other properties are given in Table III.

TABLE III

Properties of 

|  | Isomer | | |
| --- | --- | --- | --- |
|  | A | B | Assignment |
| Nuclear magnetic resonance spectrum fluorine ($CFCl_3$ ref.) | −41.1$\phi$ +45.3$\phi$ | −37.2$\phi$ +52.7$\phi$ | —$NF_2$ =NF |
| Proton (($CH_3)_4$ Si ref.) | 5.95$\tau$ | | —$CH_3$ |
| Infrared spectrum | 3.37$\mu$ 5.94 7.93 10.97 11.36 | 3.38$\mu$ 6.05 7.51 10.17 11.27 | C—H C=N C—O—C }NF and $NF_2$ |
| Gas chromatography $T_R$($CFCl_3$=100) | 804 | 686 | |

NOTE.—Vapor pressure, 72 mm. at 25° C.

Mass spectra support the formula $C_2H_3F_3N_2O$ for these compounds.

EXAMPLE 18

To a 10 cc. capacity glass reactor cooled to $-110°$ C. are transferred on a vacuum system 5 cc. of dimethyl ether and 0.75 g. (5 millimoles) of perfluoroguanidine. To this stirred solution is added under vacuum 0.076 g. (4.5 millimoles) of anhydrous ammonia. The yellow solution which forms immediately contains the adduct, $$H_2NC(NF_2)_2NFH$$

as evidenced by fluorine N.M.R. absorptions at $-20.5\phi$ ($NF_2$) and $+134\phi$ (NFH). On standing overnight at about $25°$ C. in dimethyl ether (or acetonitrile) solution, $H_2NC(NF_2)_2NFH$ spontaneously loses $HNF_2$ and is mostly converted to trifluoroguanidine, $H_2NC(NF_2)=NF$, vapor pressure about 15 mm. at room temperature. Fluorine N.M.R. absorptions are at $-47.2\phi$ due to $NF_2$ and $+50.7\phi$ due to $=NF$ in the appropriate area ratio of 2 to 1. The principal infrared absorptions are at 3.0 microns due to N-H, 5.9 microns due to C=N, and the 11.7 micron region due to N-F bonds.

EXAMPLE 19

To a 1 cc. glass reactor equipped with a polytetrafluoroethylene needle valve, containing 0.01 g. of anhydrous potassium fluoride (0.17 millimole), is added 0.1 g. of perfluoroguanidine (.67 millimole) in 0.1 cc. of tetrahydrofuran and 0.01 cc. of trichlorofluoromethane (N.M.R. reference). The reaction is allowed to take place at $25°$ C. over a period of 12 hours. At the end of this time the hydrogen fluoride addition product of perfluoroguanidine, $FC(NF_2)_2NFH$, is identified in the reaction mixture by means of fluorine N.M.R. spectroscopy which shows peaks at $-21.8\phi$, $+132.3\phi$ and $+143.5\phi$ (with relative peak areas of 4, 1 and 1, respectively). Upon expansion of the reaction mixture in a vacuum system followed by condensation back into an N.M.R. tube, the hydrogen fluoride adduct is found to eliminate difluoramine to yield the unsaturated compound, perfluoroformamidine. The presence of hydrogen fluoride in the reaction mixture enhances the formation of the intermediate $FC(NF_2)_2NFH$.

EXAMPLE 20

A 42 cc. borosilicate glass bulb is dried and charged with perfluoroguanidine at 55 mm. (0.13 millimole) and with chlorine at 360 mm. (0.82 millimole). The mixture is irradiated with an ultraviolet lamp for 19 hours at $80°$ C. and is then analyzed by gas-liquid chromatography. Identification of the components, resolved by the chromatograph, is made by passing the exiting gases directly into a Bendix Time-of-Flight mass spectrograph. Thus, peaks 17 and 19 (of relative retention time, $T_{R(CFCl3)}$, 62.3 and 70.9) are identified as the isomers A and B of C-chlorotrifluoroformamidine, $ClC(NF_2)=NF$. Subsequent isolation of these compounds by gas-liquid chromatography (GLC) permits infrared analysis which confirms the structure.

TABLE IV.—INFRARED DATA FOR ISOMERS OF C-CHLOROTRIFLUROFORMAMIDINE

| GLC peak | $T_R(CFCl_3=100)$ | Isomer | IR absorption, microns, μ |
|---|---|---|---|
| 17 | 62.3 | A | 6.2, 8.6, 9.9, 10.6, 11.2, 14.2 |
| 19 | 70.9 | B | 6.3, 8.8, 10.0, 10.6, 11.3 |

Other compounds which are illustrative of this method of preparation are included in Table V. The compounds are isolable by such means as gas-liquid chromatography and are identifiable by means of infrared and fluorine N.M.R. spectroscopy, as well as elemental analyses and molecular weight determinations.

TABLE V

| Ex. | Reactant | Moles Reactant | Millimoles | Solvent | Temp. | Products |
|---|---|---|---|---|---|---|
| 21 | $(NF_2)_2C=NF$ | 1 $CH_3N=NCH_3$ | 4 | | $^1 80°$ | $CH_3C(NF_2)=NF$ |
| 22 | $(NF_2)_2C=NF$ | 1 $\phi\overset{O}{\overset{\|}{C}}OO\overset{O}{\overset{\|}{C}}\phi$ | 2 | $CCl_4$ | $80°$ | $\phi C(NF_2)=NF$ <br> $O$ <br> $\phi\overset{\|}{\overset{O}{C}}O-C(NF_2)=NF$ |
| 23 | $(NF_2)_2C=NF$ | 1 $CF_3N=NCF_3$ | 2 | $CCl_4$ | $^1 60°$ | $CF_3-C(NF_2)=NF$ |
| 24 | $(NF_2)_2C=NF$ | 1  $O_2N-\langle\rangle-N=N-\langle\rangle-NO_2$ | 2 | $CCl_4$ | $80°$ | $O_2N-\langle\rangle-C(NF_2)=NF$ |
| 25 | $(NF_2)_2C=NF$ | 1 $Br_2$ | 6 | $CCl_4$ | $^1 80°$ | $BrC(NF_2)=NF$ |
| 26 | $(NF_2)_2C=NF$ | 1 $\{\begin{matrix}F_2\\ CF_3CF=CFCF_3\end{matrix}$ | 1 | | $25°$ | $FC(NF_2)=NF$ |
| 27 | $(NF_2)_2C=NF$ | 1 $N_2[-C(CH_3)(CN)CH_2CH_2CO_2CH_3]_2$ | 1 | $CCl_4$ | $100°$ | $CH_3O_2CCH_2CH_2C(CH_3)(CN)C(NF_2)=NF$ |

$^1$ Hour.

EXAMPLE 28

To a 1 cc. glass reactor equipped with a polytetrafluoroethylene needle valve, containing 0.01 g. of anhydrous cesium fluoride (0.07 millimole), is added 0.009 g. of perfluoromethylenimine (0.06 millimole) at $-196°$ C. After warming to room temperature over a period of several hours, the reaction is allowed to proceed for 48 hours. At the end of this time the dimer of perfluoromethylenimine, $CF_3-NF-CF=NF$, is formed in 32% yield as indicated by gas-liquid chromatography. Separation is accomplished by use of a gas-liquid chromatography column composed of 33% by weight FC-43 on Celite (a diatomaceous earth) at $0°$ C. The dimer absorbs in the infrared at 5.9, 7.4, 7.8, 10.2–10.6 and 11.9 microns (major absorptions).

EXAMPLE 29

The following example exemplifies the formation of trifluoroformamidino compounds by pyrolysis of compounds containing the tris(difluoramino)methyl moiety. Tris(difluoramino)fluoromethane which is metered at a gas flow rate of about 17 cc./min. and is mixed with nitrogen (flow rate, 80 cc./min.) is passed into a brass reactor having an inside temperature of $250°$ C. The reactor is a brass tube having an inside diameter of 1.9 cm. and a length of 46 cm. and is equipped with a gas inlet and effluent gas outlet which are made of brass and each have an orifice of 0.3 cm.; the outlet is connected to two borosilicate glass traps which are in series and are cooled with liquid air. The reactor contains about 12 grams of copper turnings which are packed in a 15 cm. zone located in the middle portion of the reactor. About 0.6 millimole of tris(difluoramino)fluoromethane is delivered into the reactor over a period of 0.75 min. The reactor is then flushed with nitrogen at a rate of 80 cc./min. for 5 minutes and then at 148 cc./min. for 15 minutes.

TABLE VI

| Example | (F₂N)₂C=NF (mmole) | Addend Formula | mmole | Solvent | Conditions Time, hours | Temp., °C. | Products | FNMR NF₂ | FNMR NFH | FNMR =NF |
|---|---|---|---|---|---|---|---|---|---|---|
| 31 | 0.72 | (CH₃)₂CHOH | 0.64 | None | 20 | 25 | (CH₃)₂CHOCNFH with NF₂ | −21 | +136 | — |
|  |  |  |  |  |  |  | (CH₃)₂CHOC=NF with NF₂ | −42 | +141 | +45 |
| 32 | 0.50 | (CH₃)₂OCHCH₂OH | 0.52 | CFCl₃ | 16 | 25 | (CH₃)₂OCHCH₂OCNFH with NF₂, NF₂ | −21 | +141 | — |
|  |  |  |  |  |  |  | (CH₃)₂OCHCH₂OC=NF with NF₂, NF₂ | −43 | +142 | +43 |
| 33 | 0.42 | CH₃OCHCH₂OH | 0.69 | CH₃CN | 16 | 25 | CH₃OCHCH₂OCNFH with NF₂, NF₂ | −21 | +142 | — |
|  |  |  |  |  |  |  | CH₃OCHCH₂OC=NF with NF₂, NF₂ | −43 | +137 | +45 |
| 34 | 0.37 | H₂NCONH₂ | 0.38 | (CH₃)₂SO₂ | 16 | 25 | H₂NCNHCNFH with NF₂, O | −18 | +137 | — |
|  |  |  |  |  |  |  | H₂NCNHC=NF with NF₂, O | −31 | +137 | +53 |
| 35 | 0.30 | CF₃—C₆H₄—NH₂ | 0.30 | CH₃CN | 0.25 | 25 | CF₃—C₆H₄—NHC(NF₂)₂NFH | −24 | +137 | (¹) |
|  |  |  |  |  |  |  | CF₃—C₆H₄—NHC=NF with NF₂ | −45 | +138 | +38 |
| 36 | 0.30 | N≡C—C₆H₄—NH₂ | 0.30 | CH₃CN | 0.25 | 25 | N≡C—C₆H₄—NHC(NF₂)₂NFH | −24 | +136 | — |
|  |  |  |  |  |  |  | N≡C—C₆H₄—NHC=NF with NF₂ | −45 | — | +34 |

¹ CF₃ at +62.

The product which collects in the traps amounts to about 0.35 millimole and contains unreacted tris(difluoramino)fluoromethane (58%), perfluoroformamidine (8.5%), difluoroaminotrifluoromethane (5%) as well as tetrafluoromethane and nitrogen trifluoride (22.5%). The percentages are area percent by chromatography.

Similarly, perfluoroformamidine is obtained at temperatures ranging from about 225° to 300° C. At the higher temperatures the interval of contact of tris(difluoramino)fluoromethane in the reaction zone is controlled so that complete fragmentation does not occur. The interval of contact can be controlled, for example, by adjusting the nitrogen flow rate.

Although copper is the preferred catalyst, other catalysts such as iron, silver, nickel and the like can be used.

EXAMPLE 30

Into a 10 cc. heavy wall glass ampoule cooled to —110° C. and fitted with a polytetrafluoroethylene needle valve is condensed on a vacuum line 5 cc. of dimethyl ether, 1.16 g. (5.0 millimoles) of $$CF_3CF_2CF_2CF=NF$$

(prepared by reaction of $CF_3CF_2CF_2CF_2NF_2$ and dicyclopentadienyliron) and 0.085 g. (5.0 millimoles) of anhydrous ammonia. The valve is closed and the reaction mixture allowed to warm to room temperature and stand for about 16 hours. The reaction mixture is then cooled to —63° C. and the dimethyl ether solvent removed under vacuum. The residue, which contains $$CF_3CF_2CF_2C(NH_2)=NF$$

(formed by elimination of HF from the intermediate unstable adduct $CF_3CF_2CF_2CF(NH_2)NFH$ is fluorinated according to Example 15, using a total of 1 g. of fluorine. The volatile gases are collected in a glass trap cooled to —183° C. and are found to contain the desired $$CF_3CF_2CF_2C(NF_2)=NF$$

Employing the procedure of Example 16 with respect to apparatus and the technique of handling perfluoroguanidine additional perfluoroformamidino compounds are prepared under the conditions shown in Table VI, above. The saturated adducts form initially and gradually convert to the unsaturated derivative on standing at room temperature. This conversion is hastened by heating and by treatment with basic reagents.

According to the procedure of Example 16 the following reactions are performed using 0.3 millimole of reactants, dry acetonitrile as solvent, and urea as catalyst where necessary. A mixture of the saturated and unsaturated products is generally obtained. In Table VII below, A is the group —$C(NF_2)_2NFH$ and TF is the trifluoroformamidino group, —$C(NF_2)=NF$.

TABLE VII

| Example | Trifluoroformamidino reactant | Second reactant | Products |
|---|---|---|---|
| 37 | $(NF_2)_2C=NF$ | $C_6H_5SO_2NHOH$ | $\{C_6H_5SO_2NHO-A, C_6H_5SO_2NHO-TF\}$ |
| 38 | $(NF_2)_2C=NF$ | $HN_3$ | $\{N_3-A, N_3-TF\}$ |
| 39 | $(NF_2)_2C=NF$ | HBr | $\{Br-A, Br-TF\}$ |
| 40 | $(NF_2)_2C=NF$ |  |  |
| 41 | $(NF_2)_2C=NF$ | Cholesterol | $\{Cholesterol-O-A, Cholesterol-O-TF\}$ |
| 42 | $(NF_2)_2C=NF$ | Testosterone | $\{Testosterone-O-A, Testosterone-O-TF\}$ |
| 43 | $(NF_2)_2C=NF$ | Corticosterone | $\{Corticosterone-O-A, Corticosterone-O-TF\}$ |
| 44 | $(NF_2)_2C=NF$ | Diethylstilbestrol |  A, TF—O—⟨C₆H₄⟩—C(C₂H₅)=C(C₂H₅)—⟨C₆H₄⟩—O—A, TF |
| 45 | $(NF_2)_2C=NF$ | $C_2H_5OOH$ | $\{C_2H_5OO-A, C_2H_5OO-TF\}$ |
| 46 | $(NF_2)_2C=NF$ [a] | Polyvinyl alcohol | —(CH₂CH(OH))ₙ—(CH₂CH(O—A,TF))ₘ— |
| 47 | $CF_2NFC=NF$ with $NF_2$ | $CF_3CONHNH_2$ | $\{CF_3CONHNHC=NF\ (NFCF_3),\ CF_3CONHNHC=NF\ (NF_2)\}$ |
| 48 | $CF_2NFCF=NF$ | $(CH_3)_2CHOH$ | $(CH_3)_2CHOC=NF\ (NFCF_3)$ |
| 49 | $(NF_2)_2C=NF$ | $KCH(CO_2C_2H_5)_2$ | $FN=C-CH(CO_2C_2H_5)_2\ (NF_2)$ |
| 50 | $(NF_2)_2C=NF$ | $CH_3COOH$ | $\{CH_3COO-A, CH_3COO-TFF\}$ |
| 51 | $(NF_2)_2C=NF$ | indole (NH) | indole (N-TF) |

[a] 10 mole excess.
* Polymer with random distribution of A and TF groups; n and m are integers.

What is claimed is:
1. A compound of the formula

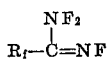

wherein $R_f$ is a polyfluoroalkyl radical of from 1 to 18 carbon atoms, which is free from functional groups which react with the trifluoroformamidino group.

2. A compound of the formula

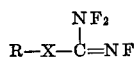

wherein R is a radical having from 1 to 30 carbon atoms, of the group consisting of alkyl, aryl, polyhaloalkyl, polyhaloaryl, alkaryl, aralkyl, polyhaloalkaryl, polyhaloaralkyl, and heterocyclic radicals which are free from functional groups which react with the trifluoroformamidino group, and X is a divalent linking radical of the group consisting of

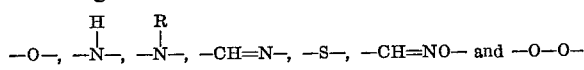

3. Trifluoroguanidine having the formula

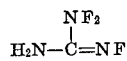

4. C-cyanotrifluoroformamidine having the formula

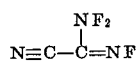

5. C-methoxytrifluoroformamidine having the formula

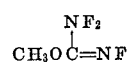

6. C-chlorotrifluoroformamidine having the formula

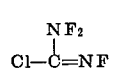

7. C-isopropoxytrifluoroformamidine having the formula

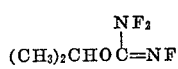

8. C - tetrahydrofurfuroxytrifluoroformamidine having the formula

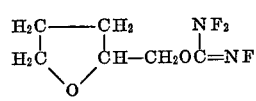

9. C-acetyltrifluoroformamidine having the formula

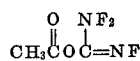

10. C-(2,3-epoxyprop-1-oxy)trifluoroformamidine having the formula

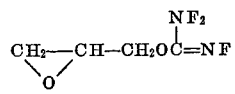

11. N-(trifluoroformamidino) - p - trifluoromethylaniline having the formula

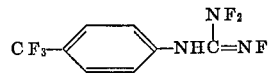

12. N-(trifluoroformamidino) - p - cyanomethylaniline having the formula

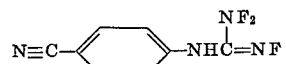

13. A compound of the formula

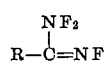

wherein R is a hydrocarbon radical of from 1 to 18 carbon atoms, which is free from functional groups which react with the trifluoroformamidino group.

14. A compound of the formula

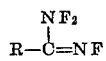

where R is an alkyl radical.

References Cited
UNITED STATES PATENTS

| | | | |
|---|---|---|---|
| 3,345,360 | 10/1967 | Firth, Jr. | 260—239 |
| 3,361,815 | 2/1968 | Hoekstra | 260—564 |
| 3,367,968 | 2/1968 | Hoekstra | 260—564 |
| 3,405,144 | 10/1968 | Brownlee | 260—349 |
| 3,410,853 | 10/1968 | Koshar | 260—248 |
| 3,461,162 | 8/1969 | Koshar et al. | 260—564 |
| 3,488,735 | 1/1970 | Benjamin | 260—479 |

LELAND A. SEBASTIAN, Primary Examiner

U.S. Cl. X.R.

149—19, 109; 260—348 R, 465 E, 465.5 R, 490, 564 R, 564 A, 583 NH, 584 C, 349, 250 R, 296 R, 308 D, 309, 329 AM, 326.15

UNITED STATES PATENT OFFICE
CERTIFICATE OF CORRECTION  PAGE 1

Patent No. 3,726,903         Dated April 10, 1973

Inventor(s) Robert J. Koshar, Charles D. Wright, Joseph LaMar Zollinger, Douglas H. Dybvig and Donald R. Husted It is certified that error appears in the above-identified patent and that said Letters Patent are hereby corrected as shown below:

Column 1, line 16, "fluoroamino" should be --fluoramino--

Column 1, line 21, "fluoroamino" should be --fluoramino--

Column 2, line 15, "$FN=C(NF_2)OCH_2CH_2CH_2CH_2OC(NF_2)=F$" should be --$FN=C(NF_2)OCH_2CH_2CH_2CH_2OC(NF_2)=NF$--

Column 3, line 10, "O" should be --Q--

Column 4, line 32 in (Eq. 3), "$N^4X-\underset{NF_2}{\overset{NF_2}{C}}=NF + NR^3$" should be --$R^4X-\underset{NF_2}{\overset{NF_2}{C}}=NF + HR^3$--

Column 5, line 25 in (Eq. 6), "$R^4-\underset{NR_2}{C}=NF$" should be --$R^4-\underset{NH_2}{C}=NF$--

Column 7, line 16, "trifluoroforamidino" should be --trifluoroformamidino--

Column 8, lines 29-30, "trifluoroformamido" should be --trifluoroformamidino--

Column 8, line 53, "difluoroamino" should be --difluoramino--

Column 8, line 59, "fluoroamino-" should be --fluoramino- --

Column 9, line 66, "Fracton" should be --Fraction--

Column 10, line 3, "eomplying" should be --employing--

Column 10, line 27, "perfluoroguandine" should be --perfluoroguanidine--

UNITED STATES PATENT OFFICE
CERTIFICATE OF CORRECTION   PAGE 2

Patent No. 3,726,903                    Dated April 10, 1973

Inventor(s) Robert J. Koshar, Charles D. Wright, Joseph LaMar Zollinger, Douglas H. Dybvig and Donald R. Husted It is certified that error appears in the above-identified patent and that said Letters Patent are hereby corrected as shown below:

Column 10, line 29, "(F N.M.R." should be --(F n.m.r.)--

Column 13, line 7, "(difluoroamino)" should be --(difluoramino)--

Column 13, line 21, "1/2 column" should be --1/2 inch column--

Column 14, line 16, "-100° C." should be -- -110° C.--

Column 14, lines 25-26, "methoxybis(difluoraminomethane," should be --methoxybis(difluoramino)fluoraminomethane,--

Column 19, line 4, "difluoroaminotrifluoromethane" should be --difluoraminotrifluoromethane--

Column 20, line 6, "$CF_3CF_2CF_2CF(NH_2)NFH$" should be --$CF_3CF_2CF_2CF(NH_2)NFH)$--

Columns 17-18, Table VI in Example No. 32 under Formula, "$\overline{(CH_2)_3OCHCH_2OH}$" should be --$\overline{(CH_2)_3OCHCH_2OH}$--

Columns 17-18, Table VI in Example No. 34 under Products,

"$H_2NCNHCNFH$ with $NF_2$ above and $O$, $NF_2$ below" should be --$H_2NCNHCNFH$ with $NF_2$ above and $O$, $NF_2$ below--

Signed and sealed this 9th day of October 1973.

(SEAL)
Attest:

EDWARD M. FLETCHER, JR.           RENE D. TEGTMEYER
Attesting Officer                 Acting Commissioner of Patents